(12) United States Patent
Cociglio

(10) Patent No.: US 8,531,987 B2
(45) Date of Patent: Sep. 10, 2013

(54) PERFORMING A TIME MEASUREMENT IN A COMMUNICATION NETWORK

(75) Inventor: Mauro Cociglio, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/519,178

(22) PCT Filed: Dec. 29, 2009

(86) PCT No.: PCT/EP2009/067991
§ 371 (c)(1),
(2), (4) Date: Jun. 26, 2012

(87) PCT Pub. No.: WO2011/079857
PCT Pub. Date: Jul. 7, 2011

(65) Prior Publication Data
US 2012/0275333 A1    Nov. 1, 2012

(51) Int. Cl.
*G01R 31/08*    (2006.01)
(52) U.S. Cl.
USPC .......................................................... 370/252
(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–522, 523–520, 521–529
See application file for complete search history.

(56) References Cited

U.S. PATENT DOCUMENTS

| 6,992,982 | B1 * | 1/2006 | Meyer et al. ................. 370/231 |
| 7,088,398 | B1 * | 8/2006 | Wolf et al. ................. 348/423.1 |
| 7,948,906 | B1 * | 5/2011 | Patel et al. ................. 370/252 |
| 8,284,795 | B2 * | 10/2012 | Peeters et al. ................. 370/465 |
| 8,285,795 | B2 * | 10/2012 | O'Sullivan et al. ........... 709/206 |
| 8,325,704 | B1 * | 12/2012 | Lemkin et al. ................. 370/350 |
| 2008/0005324 | A1 * | 1/2008 | Ge et al. ......................... 709/225 |
| 2008/0005354 | A1 * | 1/2008 | Kryskow et al. .............. 709/238 |
| 2010/0290454 | A1 * | 11/2010 | Lundberg ....................... 370/352 |
| 2011/0142079 | A1 * | 6/2011 | Wong et al. .................... 370/503 |

FOREIGN PATENT DOCUMENTS

| EP | 0234860 A2 | 9/1987 |
| EP | 1130850 A2 | 9/2001 |
| WO | 84/00268 A1 | 1/1984 |

OTHER PUBLICATIONS

Written Opinion and International Search Report mailed Jul. 1, 2010, PCT/EP2009/067991.

(Continued)

*Primary Examiner* — Jung-Jen Liu
(74) *Attorney, Agent, or Firm* — Banner & Witcoff, Ltd.

(57) ABSTRACT

A method for performing a time measurement on a data flow transmitted from a transmitter to a receiver of a communication network is provided. The method comprises: at the transmitter, dividing the data flow in first and second time alternating blocks of data units, transmitting them, increasing a transmission counter while the first blocks are transmitted and setting a transmission timestamp to a current time when a predetermined data unit of each first block is transmitted; at the receiver, receiving the first and second blocks, increasing a reception counter while the first blocks are received and setting a reception timestamp to a further current time when the predetermined data unit of each first block is received; and at a management server, periodically detecting values of the transmission counter, the reception counter, the transmission timestamp and the reception timestamp, and using them for performing the time measurement.

15 Claims, 8 Drawing Sheets

(56) References Cited

OTHER PUBLICATIONS

M. Bianchetti, G Picciano, Telecom Italia, M. Chen, J. Qium Huawei Technologies Co, Ltd; Requirements for IP multicast performance monitoring; draft-bipi-mboned-ip-multicast-pm-requirement-00.txt, Jul. 6, 2009 Internet Engineering Task Force, IETF; Standard Working Draft, Internet Society (ISOC) Geneva, Switzerland; XP015063050.

* cited by examiner

PERFORMING A TIME MEASUREMENT IN A COMMUNICATION NETWORK

CROSS REFERENCE TO RELATED APPLICATIONS

This is a U.S. National Phase Application under 35 U.S.C. §371 of International Application No. PCT/EP2009/067991, filed Dec. 29, 2009, which was published Under PCT Article 21(2), the entire contents of which are incorporated herein by reference.

TECHNICAL FIELD

The present invention relates to the field of communication networks. In particular, the present invention relates to a method for performing a time measurement (in particular, measuring delay and/or interarrival jitter) on a data flow transmitted from a transmitting node to a receiving node of a communication network. Further, the present invention relates to a communication network implementing such a method.

BACKGROUND ART

It is known that, in a packet-switched communication network, data are transmitted in the form of packets that are routed from a source node to a destination node through possible intermediate nodes. Each packet typically has a header and a payload. The header generally includes information allowing routing of the packet, such as the source node address and the destination node address. On the other hand, the payload generally comprises a portion of the data to be transmitted from the source node to the destination node. Exemplary packet-switched networks are Local Area Networks (e.g. Ethernet) and Geographic Area Networks (e.g. Internet).

On the other hand, in circuit-switched networks data are transmitted in the form of continuous bit flows carried from the source node to the destination node within plesiochronous or synchronous frames. Exemplary circuit-switched networks are PDH, SDH, Sonet and OTN networks.

Herein after, the expression "data unit" will designate a portion of a data flow transmitted in a communication network. In particular, in case of a packet-switched network, a data unit may be a packet or a portion of a packet. Besides, in case of a circuit-switched network, a data unit may be a plesiochronous frame, a portion of a plesiochronous frame, a synchronous frame or a portion of a synchronous frame.

Typically, a data unit is transmitted at a transmission time by the source node and is received at a reception time by the destination node. The time elapsing between transmission time and reception time is typically called "one way delay" (or, briefly, "delay"). The delay of a data unit is therefore given by the following equation:

$$D(i) = Ri - Si, \quad [1]$$

where Si is the transmission time and Ri is the reception time of the data unit.

The delay of a data unit mainly depends on the number of possible intermediate nodes crossed by the data unit from source to destination and on the permanence time of the data unit at the source node and at each possible intermediate node.

In a circuit-switched network, paths along which data units are transmitted are provisioned a priori by a network operator. Both the number of possible intermediate nodes crossed by data units and the permanence time of data units at each node are therefore determined a priori. Accordingly, the delay of a data unit is predictable, and all the data units of a same data flow have a same delay.

On the other hand, in a packet-switched network, data units are routed hop-by-hop by each node. Both the number of possible intermediate nodes crossed by data units and the permanence time of data units at each node are therefore unpredictable. Accordingly, the delay of a data unit is almost unpredictable. Besides, data units of a same data flow may have different delays.

In a packet-switched communication network, the difference in the delays of two data units (i.e. packets) of a same data flow is termed "interarrival jitter". In particular, if Si and Sj are the transmission times for a first packet i and a second packet j, and Ri and Rj are the reception times for the first packet i and the second packet j, the interarrival jitter may be expressed as:

$$J(i,j) = (Rj - Ri) - (Sj - Si). \quad [2]$$

When a communication service (for instance, a voice or data service) is provided by means of a communication network, the delay and interarrival jitter of the data flows carrying the service strongly affect the Quality of Service perceived by the end users of the service. In particular, in case of real-time interactive services (calls, conference calls, video conferences, etc.), a high delay or high interarrival jitter may severely impair the Quality of Service perceived by the end users. Therefore, measuring the delay and interarrival jitters of the data flows carrying these types of services is of particular interest for network operators.

WO 84/00268 discloses a method for the determination of the time delay incurred by a packet as it progresses through a packet switching system, wherein each packet has a field for accumulating the total time delay incurred by the packet in the progressing through the switching networks of the packet switching system. The total time delay field is updated as the packet is routed through each switching network of the packet system.

EP 0 234 860 discloses an arrangement for determining the random delay experienced by packets as they progress through the transmission and/or switching networks. A network node entry timestamp function inserts a so-called packet originate time value into a single timestamp field of each packet header. An exit timestamp function inserts an updated timestamp value into the timestamp field of the packet header in place of the packet originate time upon the packet exiting the network node.

SUMMARY OF THE INVENTION

The Applicant has noticed that the above known solutions of WO 84/00268 and EP 0 234 860 have some drawbacks.

First of all, both solutions disadvantageously require a rather complex processing of each data unit (i.e. each packet) of the data flow, both at the transmission side and at the reception side. For each data unit, at the transmission side a timestamp indicative of a transmission time should be generated and inserted in the data unit. Then, at the reception side, a timestamp indicative of the reception time should be generated, the timestamp indicative of the transmission time should be read from the data unit and should be processed together with the timestamp indicative of the reception time. The result of such processing should then be written again in the data unit.

All the above operations are quite complex and, moreover, they should be performed in a very short time, i.e. within the duration of a single data unit. In view of the above, implementing the known solutions mentioned above disadvantageously requires using a not negligible amount of computation resources at the nodes of the communication network.

Further, disadvantageously, according to the above known solutions the information that allows measuring delay and interarrival jitter are transmitted within the data unit itself. This means that a field of each data unit must be reserved for transporting this information. Therefore, a not negligible amount of the bandwidth in the communication network should disadvantageously be reserved for transporting this information.

In view of the above, the Applicant has tackled the problem of providing a method for performing a time measurement on a data flow transmitted from a transmitting node to a receiving node of a communication network, which overcomes the aforesaid drawbacks.

In particular, the Applicant has tackled the problem of providing a method for performing a time measurement on a data flow transmitted from a transmitting node to a receiving node of a communication network, in which the operations to be performed on the data units of the data flow are simpler than the ones of the above known solutions and whose implementation requires a negligible amount of computation resources at the nodes of the communication network and a negligible amount of bandwidth on the links of the communication network.

In the following description and in the claims, the expression "performing a time measurement on a data flow" will designate an operation of measuring:
- a delay induced on a data unit of the data flow by transmission between the transmitting node and the receiving node; and/or
- an interarrival jitter induced on a pair of data units of the data flow by transmission between the transmitting node and the receiving node.

The transmitting node and the receiving node may be either physically adjacent nodes (i.e. they are connected by a physical link such as e.g. an optical fiber), or they may be connected through intermediate nodes.

Besides, in the following description and in the claims, the expression "marking a data unit" will designate an operation of setting a feature of the data unit to a value suitable for distinguishing the data unit from other data units of the same data flow. For instance, the operation of marking a data unit may comprise the operation of setting one or more bits of the data unit (e.g. one bit or a bit sequence of its header) to a predefined value, the operation of setting its frequency or its phase to a predefined value, and so on.

According to a first aspect, the present invention provides a method for performing a time measurement on a data flow to be transmitted from a transmitting node to a receiving node of a communication network, the method comprising:
a) at the transmitting node:
   dividing the data flow in first blocks comprising data units having a feature set to a first value and in second blocks comprising further data units having the feature set to a second value, the first blocks alternating in time with the second blocks; and
   transmitting the first blocks and the second blocks, transmitting comprising increasing a first transmission counter while the data units of the first blocks are transmitted and setting a first transmission timestamp to a current time when a predetermined data unit of each of the first blocks is transmitted;
b) at the receiving node, receiving the first blocks and the second blocks, receiving comprising increasing a first reception counter while the data units the first blocks are received and setting a first reception timestamp to a further current time when the predetermined data unit of each of the first blocks is received; and
c) at a management server cooperating with the communication network, periodically detecting with a detection period values of the first transmission counter, the first reception counter, the first transmission timestamp and the first reception timestamp, and performing a time measurement on the data flow based on detected values of the first transmission counter, the first reception counter, the first transmission timestamp and the first reception timestamp.

Preferably, dividing comprises marking each data unit of the first blocks by setting at least one bit of the data unit to the first value and marking each further data unit of the second blocks by setting at least one bit of the further data unit to the first value.

Preferably, dividing comprises dividing the data flow in the first blocks and the second blocks all having a time duration equal to a block period.

Preferably, in periodically detecting with the detection period, the block period is equal to at least twice the detection period.

Preferably:
   at step a), transmitting further comprises increasing a second transmission counter while the further data units of the second blocks are transmitted and setting a second transmission timestamp to a current time when a predetermined further data unit of each of the second blocks is transmitted;
   at step b), receiving further comprises increasing a second transmission counter while the further data units of the second blocks are received and setting a second reception timestamp to a further current time when the predetermined further data unit of each of the second blocks is received; and
   at step c), detecting further comprises periodically detecting values of the second transmission counter, the second reception counter, the second transmission timestamp and the second reception timestamp, and performing the time measurement on the data flow based also on detected values of the second transmission counter, the second reception counter, the second transmission timestamp and the second reception timestamp.

Preferably, in step c) performing the time measurement comprises, at each detection period, comparing the value of the first transmission counter, the value of the second transmission counter, the value of the first reception counter and the value of the second reception counter detected at the detection period with one or more previously detected values of the first transmission counter, the second transmission counter, the first reception counter and the second reception counter for determining whether each of the first transmission counter, the second transmission counter, the first reception counter and the second reception counter currently has a constant value or is increasing.

Preferably, at step c) performing the time measurement comprises, at each detection period:
   if the first transmission counter has a constant value and the second transmission counter is increasing, setting a measurement transmission timestamp $S(q)$ equal to the value of the first transmission timestamp detected at the detection period; and
   if the first transmission counter is increasing and the second transmission counter has a constant value, setting the measurement transmission timestamp S(q) equal to the value of the second transmission timestamp detected at the detection period.

Preferably, at step c) performing the time measurement comprises, at each detection period:
if the first reception counter has a constant value and the second reception counter is increasing, setting a measurement reception timestamp R(q) equal to the value of the first reception timestamp detected at the detection period; and
if the first reception counter is increasing and the second reception counter has a constant value, setting the measurement reception timestamp R(q) equal to the value of the second reception timestamp detected at the detection period.

Preferably, at step c) performing the time measurement comprises, at each detection period, calculating a delay D(q) as a difference between the measurement reception timestamp R(q) and the measurement transmission timestamp S(q).

Preferably, at step c) performing the time measurement comprises, at each detection period, calculating an interarrival jitter J(q) as a difference between the delay D(q) calculated at the detection period and a previous delay D(q−1) calculated during a previous detection period.

Preferably:
at step a), setting the first transmission timestamp to a current time is performed each time a first data unit of the first blocks is transmitted; and
at step b), setting the first reception timestamp to a further current time is performed each time the first data unit of the first blocks is received.

Preferably:
at the step a), setting the first transmission timestamp to a current time is performed also each time an (n*M)+1 data unit of the first blocks is transmitted; and
at the step b), setting the first reception timestamp to a further current time is performed also each time the (n*M)+1 data unit of the first blocks is received,
M being a fixed integer number and n being an integer index.

Preferably, step c) further comprises periodically calculating a data loss DL(k) for validating the time measurement.

According to a further aspect, the present invention provides a computer program product, loadable in the memory of at least one computer and including software code portions for performing the above method steps when the product is run on a computer.

According to a further aspect, the present invention provides a communication network comprising a transmitting node, a receiving node and a management server suitable for cooperating with the communication network, wherein:
the transmitting node is configured to:
divide the data flow in first blocks comprising data units having a feature set to a first value and in second blocks comprising further data units having the feature set to a second value, the first blocks alternating in time with the second blocks; and
transmit the first blocks and the second blocks, the transmitting comprising increasing a first transmission counter while the data units of the first blocks are transmitted and setting a first transmission timestamp to a current time when a predetermined data unit of each of the first blocks is transmitted;
the receiving node is configured to receive the first blocks and the second blocks, the receiving comprising increasing a first reception counter while the data units of the first blocks are received and setting a first reception timestamp to a further current time when the predetermined data unit of each of the first blocks is received; and
the management server is configured to periodically detect values of the first transmission counter, the first reception counter, the first transmission timestamp and the first reception timestamp, and perform a time measurement on the data flow based on detected values of the first transmission counter, the first reception counter, the first transmission timestamp and the first reception timestamp.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Herein after, a first preferred embodiment of the method will be described in detail by referring to the particular exemplary case of performing a time measurement in a packet-switched network by measuring delay and/or interarrival jitter of packets (i.e. the data unit is a packet) induced by transmission from a transmitting node to a receiving node.

Figure 1:
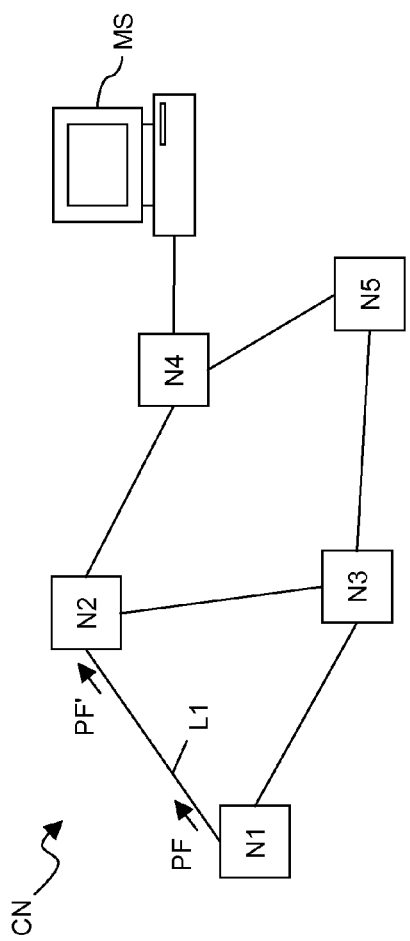
FIG. 1 schematically shows an exemplary packet-switched network.

FIG. 1 schematically shows an exemplary packet-switched communication network CN comprising five nodes N1, N2, . . . N5 connected to each other according to a partially meshed topology. In particular, the nodes N1 and N2 are adjacent nodes connected by the link L1. The number of nodes and the topology of the communication network CN are merely exemplary. The communication network CN may be for instance an Ethernet network, an Internet network, or any other type of packet-switched communication network.

The communication network CN is suitable for cooperating with a management server MS. In FIG. 1, the management server MS is connected to the node N4. This is merely exemplary, since the management server MS may be connected to the communication network CN through any of its nodes N1, N2, . . . , N5. Alternatively, the management server MS may be integrated in any of the nodes N1, N2, . . . , N5 of the communication network CN. The role of the management server MS will be described in detail herein after.

The nodes N1, N2, . . . , N5 of the communication network CN exchange traffic in the form of packet flows. By way of example, herein after only the packet flow PF transmitted from the node N1 (herein after termed "transmitting node") to the node N2 (herein after termed "receiving node") through the link L1 will be considered. The transmitting node N1 may be either the source node of the packet flow PF or an intermediate node of the path from the source node to the destination node. Similarly, the receiving node N2 may be either the destination node of the packet flow PF or an intermediate node of the path from the source node to the destination node.

Figure 2:
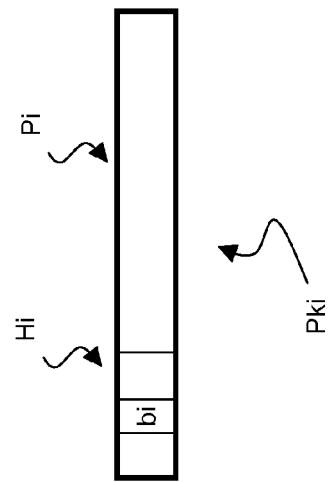
FIG. 2 schematically shows a packet's structure, according to an embodiment of the present invention.

The packet flow PF comprises a plurality of packets Pki. As shown in FIG. 2, each packet Pki has a header Hi and a payload Pi. As mentioned above, the payload Pi comprises a portion of the traffic to be transmitted from the source node to the destination node. Besides, preferably, the header Hi comprises information for routing the packet Pki, such as the source node address (i.e. the address of the transmitting node N1, if it is the source node) and the destination node address (i.e. the address of the receiving node N2, if it is the destination node). According to embodiments of the present invention, the header Hi of each packet Pi further comprises a bit bi. Preferably, the bit bi is used by the transmitting node N1 for marking the packet Pki, thus allowing the receiving node N2 to perform a time measurement on the packet flow PF, as it will be described in detail herein after.

According to embodiments of the present invention, upon transmission of the packets Pki of the packet flow PF to the receiving node N2 along the link L1, the transmitting node N1 preferably marks the packets Pki for dividing the packet flow PF in blocks, each block comprising a number of packets Pki. The blocks may be all of a same length (i.e. they may all comprise a same number of packets Pki), or they may have different lengths.

The transmitting node N1 preferably uses the bit bi of the header Hi of each packet Pki for marking the packets Pki. In particular, since the bit bi may assume only two values (1 and 0), the transmitting node N1 marks the packets Pki by setting the value of the bit bi of the various packets Pki according to the following rules:
i. packets Pki included in a same block have the bit bi with a same value; and
ii. packets Pki included in contiguous blocks have the bit bi with different values.

The bit bi may be for instance a bit to which the protocol according to which the packet Pki is formatted has not assigned a specific function yet. Alternatively, the bit bi may be a bit of a field having other uses, such as for instance a bit of the priority field in IP packets, or a bit of the label field in MPLS packets.

Therefore, for instance, assuming that N is the number of packets Pki for each block, the transmitting node N1 may form a first block by setting the bit bi of N consecutive packets Pki equal to 1, then form a second block by setting the bit bi of the N successive packets Pki equal to 0, then form a third block by setting the bit bi of the N successive packets Pki equal to 1, then form a fourth block by setting the bit bi of the N successive packets Pki equal to 0, and so on.

The packet flow PF is then divided in a sequence of blocks, wherein blocks including packets Pki marked by the bit bi equal to 1 alternate with blocks including packets Pki marked by the bit bi equal to 0.

According to a particularly preferred embodiment, the transmitting node N1 marks the various packets Pki, not according to the number of packets Pki to be included in each block, but according to a timer, as it will be described herein after by referring to the flow chart of FIG. 3.

Figure 3:
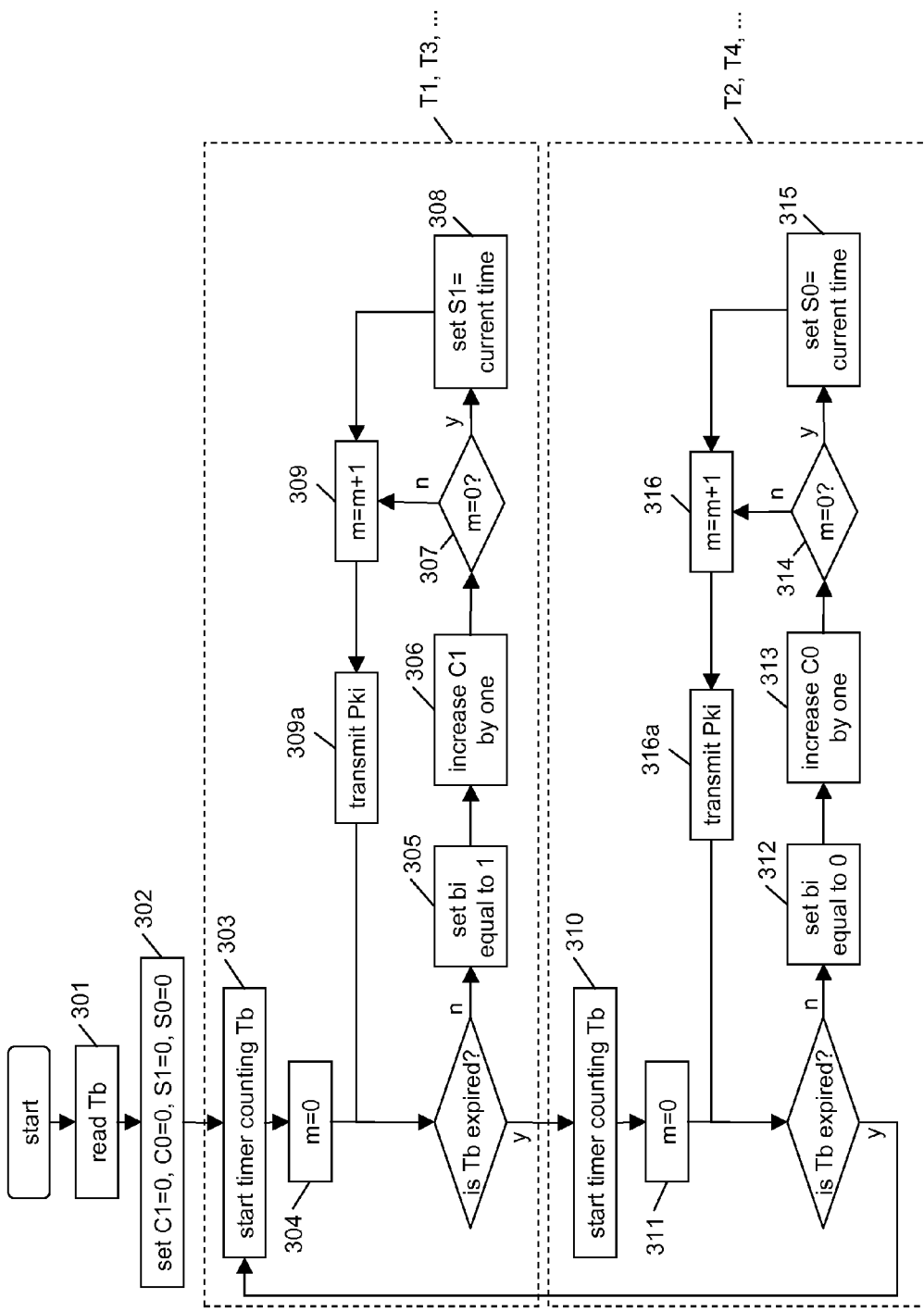
FIG. 3 is a flow chart of the operation of the transmitting node, according to a first embodiment of the present invention.

With reference to FIG. 3, when the transmitting node N1 determines that a time measurement relative to the packet flow PF has to be started, it preferably sets a block period Tb (step 301). During step 301, the block period Tb may be automatically set by the transmitting node N1 according to predefined criteria, such as the speed of the port through which the packet flow PF is transmitted, the hour of the day, and the available resources at the transmitting node N1. Alternatively, the block period Tb may be automatically set by the management server MS and transmitted to the transmitting node N1 in a management message (e.g. a management message commanding the transmitting node N1 to start the operations allowing the time measurement). Alternatively, the block period Tb may be manually input at the management server MS by an operator responsible of managing the communication network CN, e.g. by means of a graphic user interface (not shown in FIG. 1) of the management server MS. The block period may be for instance 5 minutes.

Then, preferably, the transmitting node N1 initialises, a first counter C1, a second counter C0, a first transmission timestamp S1 and a second transmission timestamp S0 at the value 0 (step 302).

Then, preferably, the transmitting node N1 starts a timer expiring after a block period Tb (step 303), thus starting a first block period T1 (see also FIG. 4), and initialises an index m at the value 0 (step 304).

While the timer is not expired (i.e. during the first block period T1), each time the transmitting node N1 has to transmit a packet Pki of the packet flow PF, it marks it by setting its bit bi to a first value, namely 1 (step 305). Besides, each time the transmitting node N1 sets the bit bi of a packet Pki equal to 1, it increases by one the value of the first counter C1 (step 306). Then, the transmitting node N1 preferably checks whether the index m is equal to 0 (step 307). In the affirmative, the transmitting node N1 preferably sets the first transmission timestamp S1 equal to the current time indicated by a local clock of the transmitting node N1 (step 308), increases the index m by one (step 309) and transmits the packet Pki (step 309a). In the negative, the transmitting node N1 preferably increases the index m by one (step 309) and transmits the packet Pki (step 309a). Therefore, the first transmission timestamp S1 is set to the current time only for the packet transmitted first during the first block period T1, while it is kept constant upon transmission of all the subsequent packets during the first block period T1.

Figure 4:
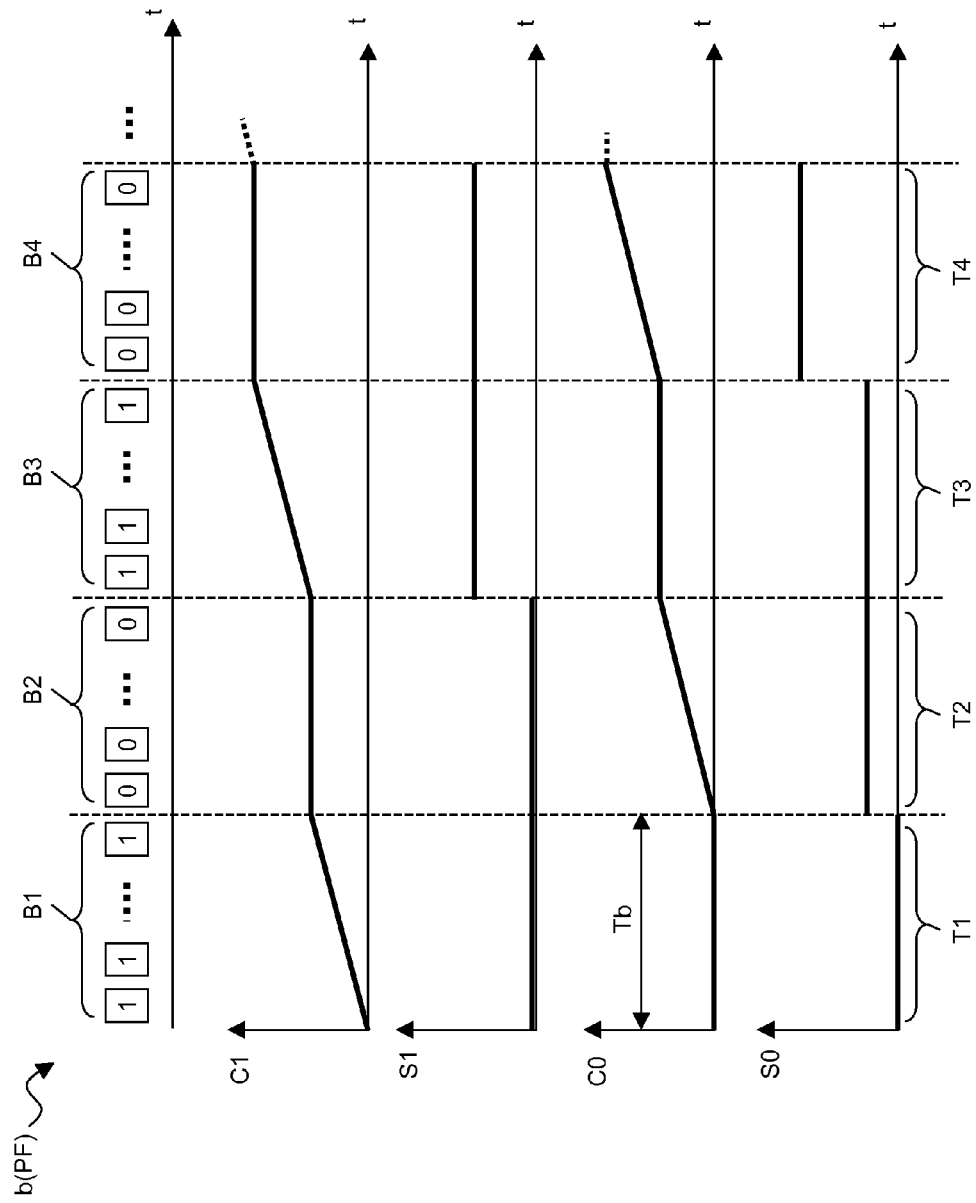
FIG. 4 shows five time diagrams relating to the operation of the transmitting node.

Therefore, during the first block period T1, all the packets Pki transmitted by the transmitting node N1 form a first block B1 (shown in FIG. 4) and are marked by their bit bi set to 1 (in FIG. 4, the reference "b(PF)" indicates the values of the bit bi for the packets Pki of the packet flow PF), the first transmission timestamp S1 as set at step 308 indicating the transmission time of the first packet of the first block B1. Besides, as also shown in FIG. 4, during the first block period T1 the value of the first counter C1 increases, and at the end of the first block period T1 is equal to the number of packets Pki forming the first block B1. Besides, as also shown in FIG. 4, during the first block period T1 the second counter C0 and the second transmission timestamp S0 remain equal to 0.

When the timer expires, the transmitting node N1 preferably restarts it (step 310), thus starting a second block period T2 (see also FIG. 3), and sets again the index m at the value 0 (step 311).

While the timer is not expired (i.e. during the second block period T2), each time the transmitting node N1 has to transmit a packet Pki of the packet flow PF, it marks it by setting its bit bi to a second value, namely 0 (step 312). Besides, each time the transmitting node N1 sets the bit bi of a packet Pki equal to 0, it increases by one the value of the second counter C0 (step 313). Then, the transmitting node N1 preferable checks whether the index m is equal to 0 (step 314). In the affirmative, the transmitting node N1 preferably sets the second transmission timestamp S0 equal to the current time indicated by a local clock of the transmitting node N1 (step 315), increases the index m by one (step 316) and transmits the packet Pki (step 316a). In the negative, the transmitting node N1 preferably increases the index m by one (step 316) and transmits the packet Pki (step 316a). Therefore, the second transmission timestamp S2 is set to the current time only for the packet transmitted first during the second block period T2, while it is kept constant upon transmission of all the subsequent packets during the second block period T2.

Therefore, during the second block period T2, all the packets Pki transmitted by the transmitting node N1 form a second block B2 (shown in FIG. 4) and are marked with their bit bi set to 0 (as shown in FIG. 4) the second transmission timestamp S2 as set at step 315 indicating the transmission time of the first packet of the second block B2. Besides, as also shown in FIG. 4, during the second block period T2 the value of the second counter C0 increases, and at the end of the second block period T2 is equal to the number of packets Pki forming the second block B2. Besides, as also shown in FIG. 4, during the second block period T2 the first counter C1 remains equal to the value reached at the end of the first block period T1, while the first transmission timestamp S1 remains equal to the value set during the first time period T1.

Then, the transmitting node N1 preferably repeats the above described steps 305-309 thereby forming, during a third block period T3, a third block B3 comprising packets Pki having their bits bi set to 1, and thereby setting the first transmission timestamp S1 to a value indicating the transmission time of the first packet of the third block B3. Besides, as also shown in FIG. 4, during the third block period T3 the value of the first counter C1 further increases, and at the end of the third block period T3 is equal to the overall number of packets Pki forming the first block B1 and the third block B3. Besides, as also shown in FIG. 4, during the third block period T3 the second counter C0 remain equal to the value reached during the second block period T2, while the second transmission timestamp S0 remains equal to the value set during the second time period T2.

Then, the transmitting node N1 preferably repeats the above described steps 311-316 thereby forming, during a fourth block period T4, a fourth block B4 comprising packets Pki having their bits bi set to 0, and thereby setting the second transmission timestamp S0 to a value indicating the transmission time of the first packet of the fourth block B4. Besides, as also shown in FIG. 4, during the fourth block period T4 the value of the second counter C0 further increases, and at the end of the fourth block period T4 is equal to the overall number of packets Pki forming the second block B2 and the fourth block B4. Besides, as also shown in FIG. 4, during the fourth block period T4 the first counter C1 remains equal to the value reached at the end of the third block period T3, while the first transmission timestamp S1 remains equal to the value set during the third time period T3.

Preferably, the transmitting node N1 cyclically repeats steps 305-309 and steps 312-316, thereby generating further blocks comprising, alternatively, packets Pki marked by 1 and packets Pki marked by 0. Such blocks are not shown in FIG. 4 for simplicity.

It has to be noticed that packets formed according to the above described flow chart of FIG. 3 within a same time measurement session have all substantially a same duration, but they may include different numbers of packets Pki. Indeed, the number of packets Pki forming a given block depends on the number of packets actually transmitted by the transmitting node Nb during the block period corresponding to the block. For instance, during low-traffic hours, the blocks comprise a lower number of packets that during high-traffic hours. For the same reason, the first packet Pki of each block (for which the first and second transmission timestamps are set during steps 308 and 315) is not necessarily transmitted at the beginning of the corresponding block period.

Advantageously, the above disclosed operation of the transmitting node N1 is very simple. The transmitting node N1 simply has to mark each packet Pki to be transmitted for forming the blocks, to increase the proper counter and to set the proper transmission timestamp upon transmission of the first packet of each block. All these operations are very simple, and may advantageously be implemented by software modules that are typically available at the nodes of a current packet-switched network.

Figure 5:
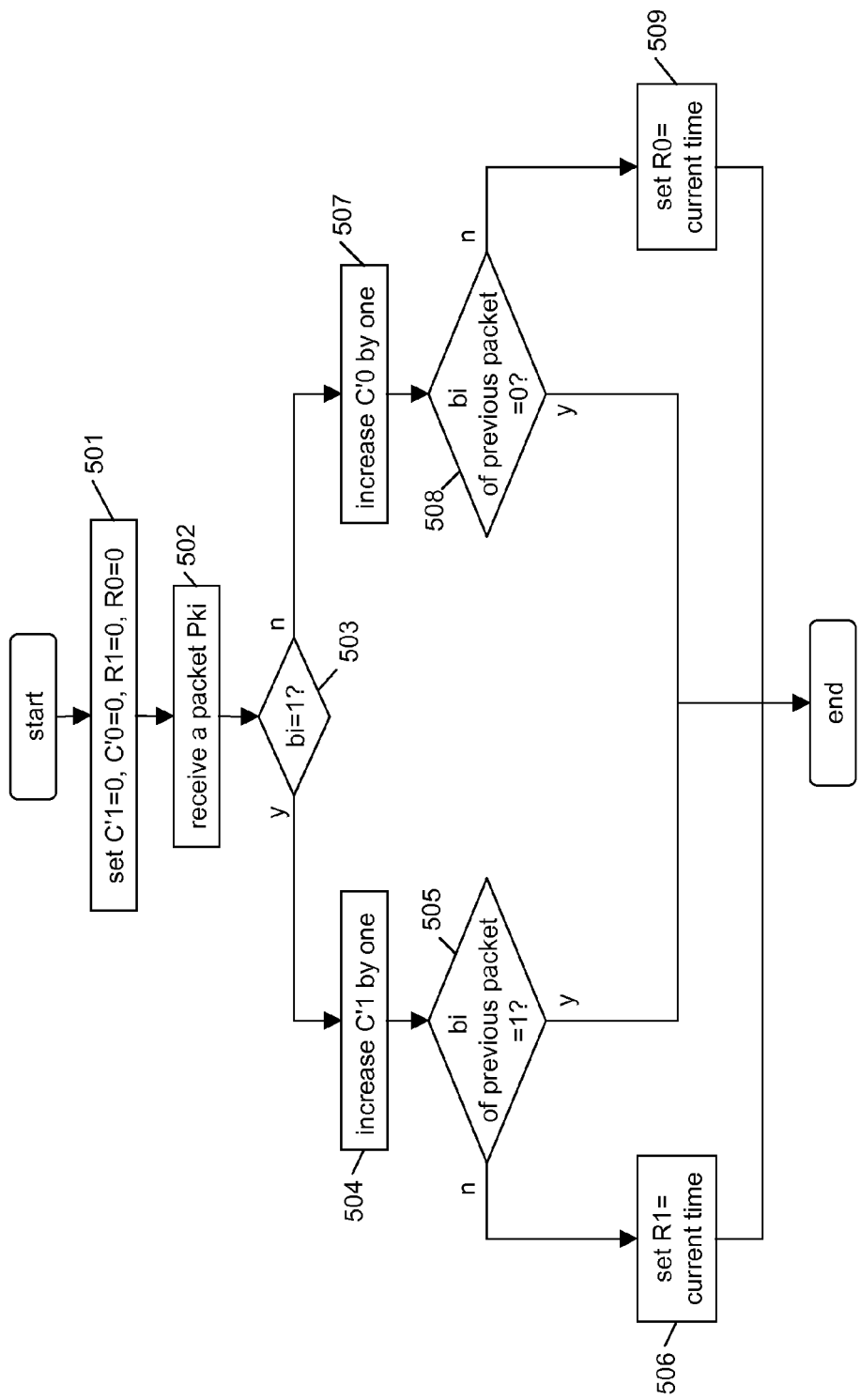
FIG. 5 is a flow chart of the operation of the receiving node, according to the first embodiment of the present invention.
Figure 6:
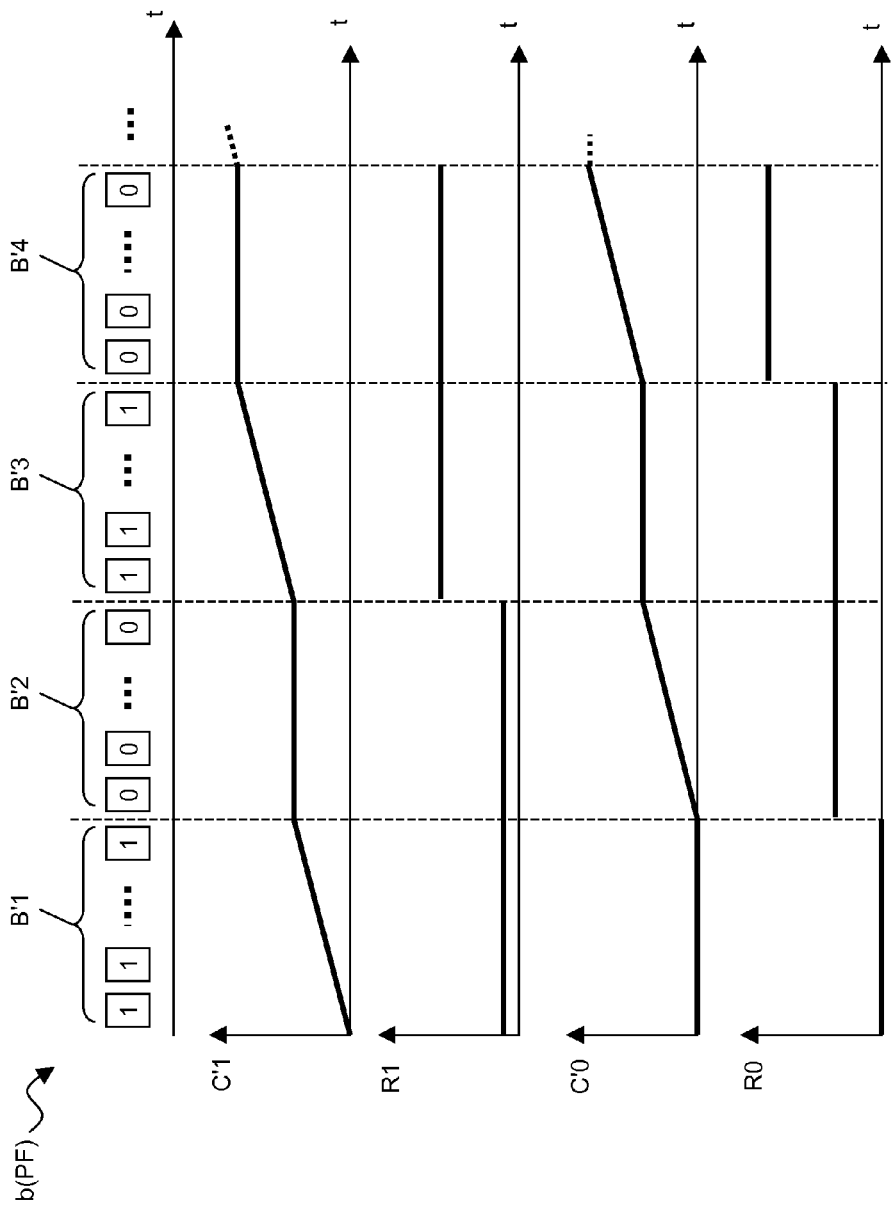
FIG. 6 shows five time diagrams relating to the operation of the receiving node.

By referring now to FIGS. 5 and 6, the packet flow PF divided in blocks B1, B2, B3, B4, . . . is transmitted to the receiving node N2, that receives a further packet flow PF' divided in corresponding further blocks B1', B2', B3', B4'. Each further block B1', B2', B3', B4', . . . differs from the corresponding block B1, B2, B3, B4, . . . in that one or more packets Pki originally comprised in the block have been lost during transmission on the link L1, and in that the packets exhibit delay and/or interarrival jitter.

Before starting receiving the further blocks B1', B2', B3', B4', the receiving node N2 preferably initialises a third counter C'1, a fourth counter C'0, a first reception timestamp R1 and a second reception timestamp R0 at the value 0 (step 501). Step 501 may be triggered e.g. by a management message transmitted from the management server MS and commanding the receiving node N2 to start a time measurement for the packet flow PF.

Then, the receiving node N2 listens for possible packets Pki received from the transmitting node N1 on the link L1. Each time a packet Pki is received (step 502), the receiving node N2 preferably checks its marking, i.e. it checks the value of its bit bi (step 503).

If the bit bi is equal to 1, the receiving node N2 preferably increases by one the third counter C'1 (step 504). Then, the receiving node N2 preferably checks whether the previously received packet has the same marking as the current packet Pki (step 505). In the affirmative, the receiving node N2 determines that the packet Pki is not the first packet of a block, and preferably does not perform any other action. In the negative, the receiving node N2 determines that the packet Pki is the first packet of a block, and preferably sets the first reception timestamp R1 equal to the current time indicated by a local clock of the receiving node N2 (step 506).

If the bit bi is equal to 0, the receiving node N2 preferably increases by one the fourth counter C'0 (step 507). Then, the receiving node N2 preferably checks whether the previously received packet has the same marking as the current packet Pki (step 508). In the affirmative, the receiving node N2 determines that the packet Pki is not the first packet of a block, and preferably does not perform any other action. In the negative, the receiving node N2 determines that the packet Pki is the first packet of a block, and preferably sets the second reception timestamp R0 equal to the current time indicated by a local clock of the receiving node N2 (step 509).

Therefore, as shown in FIG. 6, while the receiving node N2 is receiving packets Pki of the blocks B'1, B'3, . . . corresponding to the blocks B1, B3, . . . of FIG. 4, the third counter C'1 is increased and the first reception timestamp R1 is set to the reception time of the first packet of the blocks B'1, B'3, . . . , while the fourth counter C0 and the second reception timestamp R0 are fixed. On the other hand, while the receiving node N2 is receiving packets Pki of the blocks B'2, B'4, . . . corresponding to the blocks B2, B4, . . . of FIG. 4, the fourth counter C0 is increased and the second reception timestamp R0 is set to the reception time of the first packet of the blocks B'2, B'4, . . . , while the third counter C1 and the first reception timestamp R1 are fixed.

Advantageously, also the operation of the receiving node N2 is very simple. The receiving node N2 simply has to read the marking of each received packet Pki, to increase the proper counter and to set the proper reception timestamp upon reception of the first packet of each block. All these operations are very simple, and may advantageously be implemented by software modules that are typically available at the nodes of a current packet-switched network.

Therefore, while the packet flow PF is being transmitted from the transmitting node N1 to the receiving node N2, the transmitting node N1 sets the bits bi for forming the above blocks, correspondingly increases the counters C1 and C0 and sets the transmission timestamps S1, S0, while the receiving block N2 reads the bits bi, correspondingly increases the counters C'1 and C'0 and sets the reception timestamps R1, R0.

According to embodiments of the present invention, the management server MS periodically detects the values of the counters C1 and C0 and of the transmission timestamps S1 and S0 at the transmitting node N1 and the values of the counters C'1 and C'0 and of the reception timestamps R1, R0 at the receiver node N2, and uses these values for performing a time measurement on the packet flow PF.

Figure 7:
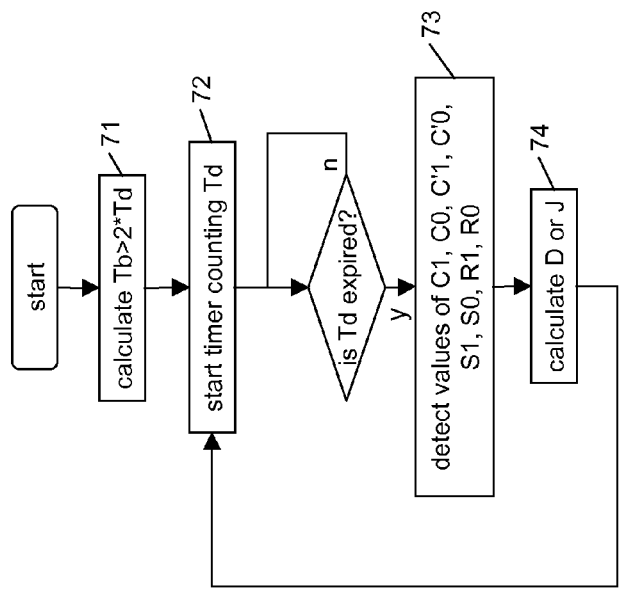
FIG. 7 is a flow chart of the operation of the management server.

In particular, by referring FIG. 7, the management server MS preferably sets a detection period Td (step 71), i.e. a period for cyclically detecting the values of the counters C1, C0, C'1 and C0 and of the timestamps S1, S0, R1, R0. The criteria to set the detection period Td may be a time limit depending on the implementation of sampling and processing mechanisms, or could be a specific desired detection period Td higher than such time limit. Preferably, during step 71 the block period Tb is calculated so that, in every block period Tb, the values of the counters C1, C0, C'1 and C0 and of the timestamps S1, S0, R0, R0 are detected at least twice. This advantageously allows the management server MS to determine, for each block period, which counter is increasing and which one has a fixed value.

For instance, the block period Tb may be calculated according to the following formula:

$$Tb > 2*Td, \quad [3]$$

For instance, in case the detection period Td is 1 minute, equation [3] results in a block period Tb of more than 2 minutes, preferably at least 3 or more minutes. Preferably, the block period Tb is calculated according to the following formula:

$$Tb >= 3*Tb, \quad [4]$$

For instance, in case the detection period Td is 1 minute, equation [4] results in a block period Tb higher than or equal to 3 minutes.

After setting the detection period Td, the management server MS preferably starts a timer counting the detection period Td (step 72) and, each time the timer expires, detects the values of the first counter C1, the second counter C0, the first transmission timestamp S1 and the second transmission timestamp S0 at the transmitting node N1, and detects the values of the third counter C'1, the fourth counter C'0, the first reception timestamp R1 and the second reception timestamp R0 at the receiving node N2 (step 73). Preferably, the management server MS performs step 703 by transmitting to the transmitting node N1 a suitable management message requesting the current values of the counters C1 and C0 and of the transmission timestamps S1 and S0, and by transmitting to the receiving node N2 a suitable management message requesting the current values of the counters C'1 and C0 and of the reception timestamps R1 and R0.

Then, after detecting the values of the counters C1, C0, C'1 and C'0 and of the timestamps S1, S0, R1 and R0, the management server MS preferably uses such values for calculating a delay D and/or or an interarrival jitter J (step 74)

Steps 73 and 74 are periodically repeated at every detection period Td. Therefore, at a given detection period Td (e.g. the k-th detection period) the management server MS detects values C1(k), C0(k), C'1(k), C'0(k), S1(k), S0(k), R1(k) and R0(k), k being an integer index corresponding to the detection period.

Table I herein below shows a numerical example of the values C1(k), C0(k), C'1(k), C'0(k), S1(k), S0(k), R1(k) and R0(k) detected by the management server MS, assuming that the block period Tb is 5 minutes and the detection period Td is 2 minutes. For simplicity, Table I only shows the first 9 detected values. It is assumed that:

- during the first block period T1, 277 packets are transmitted, the first packet being transmitted at a transmission time (as provided by the local clock of the transmitting node N1) equal to 00.03;
- during the second block period T2, 262 packets are transmitted, the first packet being transmitted at a transmission time (as provided by the local clock of the transmitting node N1) equal to 05.02;
- during the third block period T3, 673 packets are transmitted, the first packet being transmitted at a transmission time (as provided by the local clock of the transmitting node N1) equal to 10.01; and
- during the fourth block period T4, the first packet is transmitted at a transmission time (as provided by the local clock of the transmitting node N1) equal to 15.02.

The detection times and the values of the timestamps are expressed in minutes and seconds.

TABLE I

| de-tec-tion | | N1 | | | | N2 | | |
|---|---|---|---|---|---|---|---|---|
| k | time | C1(k) | S1(k) | C0(k) | S0(k) | C'1(k) | R1(k) | C'0(k) | R0(k) |
| 1 | 00.00 | 0 | 0 | 0 | 0 | 0 | 0 | 0 | 0 |
| 2 | 02.00 | 112 | 00.03 | 0 | 0 | 110 | 00.04 | 0 | 0 |
| 3 | 04.00 | 234 | 00.03 | 0 | 0 | 237 | 00.04 | 0 | 0 |
| 4 | 06.00 | 277 | 00.03 | 103 | 05.02 | 277 | 00.04 | 101 | 05.04 |
| 5 | 08.00 | 277 | 00.03 | 212 | 05.02 | 277 | 00.04 | 210 | 05.04 |
| 6 | 10.00 | 277 | 00.03 | 259 | 05.02 | 277 | 00.04 | 256 | 05.04 |
| 7 | 12.00 | 403 | 10.01 | 262 | 05.02 | 401 | 10.03 | 261 | 05.04 |
| 8 | 14.00 | 827 | 10.01 | 262 | 05.02 | 819 | 10.03 | 261 | 05.04 |
| 9 | 16.00 | 950 | 10.01 | 380 | 15.02 | 819 | 10.03 | 261 | 05.04 |

Herein after, by referring to FIG. 8, step 74 of calculating the delay D and/or the interarrival jitter J will be described in detail, by referring to a generic k-th detection period.

After step 73, the management system MS preferably compares the values C1(k) and C0(k) detected during the current detection period (i.e. the k-th detection period) with the values C1(k−1) and C0(k−1), respectively, detected during a previous detection period (sub-step 741). According to preferred embodiments not shown in the drawings, the management server MS compares C1(k) and C0(k) not only with the values of C1 and C0 detected during the previous detection period, but also with the values of C1 and C0 detected during still preceding detection periods. This advantageously allows making the time measurement more reliable in case of low traffic between the nodes N1 and N2. Indeed, in this case, two consecutively detected values of a counter (e.g. C1) may be constant because in that block period Tb the transmitting node N1 is not transmitting any packet at all, and not because the transmitting node N1 is transmitting packets Pki marked by their bit bi equal to 0.

Then, the management system MS preferably determines whether the value C1(k) is equal to the value C1(k−1) and whether the value C0(k) is equal to the value C0(k−1) (sub-step 742).

Firstly, it is assumed that the value C1(k) is equal to the value C1(k−1), while the value of C0(k) is different from the value C0(k−1). By referring to Table I, this condition is fulfilled e.g. for k=5. In this case, the management server MS realizes that the currently detected values C1(k) and C0(k) refer to a block period Tb wherein the first counter C1 has a fixed value, while the second counter C0 is increasing (see e.g. the second block period T2 and the fourth block period T4 of FIG. 4), since the currently transmitted packets Pki are marked by their bit bi equal to 0. The management server MS then preferably sets a measurement transmission timestamp S(q) equal to the currently detected value S1(k) of the first transmission timestamp (sub-step 743).

Otherwise, if the value C1(k) is different from the value C1(k−1), while the value of C0(k) is equal to the value C0(k−1), the management server MS realizes that the currently detected values C1(k) and C0(k) refer to a block period Tb wherein the second counter C0 has a fixed value, while the first counter C1 is increasing (see e.g. the first block period T1 and the third block period T3 of FIG. 4), since the currently transmitted packets Pki are marked by their bit bi equal to 1. By referring to Table I, this condition is fulfilled e.g. for k=8. The management server MS then preferably sets the measurement transmission timestamp S(q) equal to the currently detected value S0(k) of the second transmission timestamp (sub-step 744).

Substantially in parallel to sub-steps 741-744, the management system MS preferably compares the values C'1(k) and C'0(k) detected during the current detection period (i.e. the k-th detection period) with the values C'1(k−1) and C'0(k−1), respectively, detected during a previous detection period (sub-step 741'). According to preferred embodiments not shown in the drawings, the management server MS compares C1(k) and C'0(k) not only with the values of C'1 and C'0 detected during the previous detection period, but also with the values of C'1 and C0'0 detected during still preceding detection periods. This advantageously allows making the time measurement more reliable in case of low traffic between the nodes N1 and N2. Indeed, in this case, two consecutively detected values of a counter (e.g. C'1) may be constant because in that block period the receiving node N2 is not receiving any packet at all, and not because the receiving node N2 is receiving packets Pki marked by their bit bi equal to 0.

Then, the management system MS preferably determines whether the value C'1(k) is equal to the value C'1(k−1) and whether the value C'0(k) is equal to the value C'0(k−1) (sub-step 742').

Firstly, it is assumed that the value C'1(k) is equal to the value C'1(k−1), while the value of C'0(k) is different from the value C'0(k−1). By referring to Table I, this condition is fulfilled e.g. for k=5. In this case, the management server MS realizes that the third counter C'1 is currently having a fixed value while the fourth counter C'0 is increasing, since the currently received packets Pki are marked by their bit bi equal to 0. The management server MS then preferably sets a measurement reception timestamp R(q) equal to the currently detected value R1(k) of the first transmission timestamp (sub-step 743').

Otherwise, if the value C'1(k) is different from the value C'1(k−1), while the value of C'0(k) is equal to the value C'0(k−1), the management server MS realizes that the fourth counter C'0 is currently having a fixed value while the third counter C'1 is increasing, since the currently transmitted packets Pki are marked by their bit bi equal to 1. By referring to Table I, this condition is fulfilled e.g. for k=8. The management server MS then preferably sets the measurement reception timestamp R(q) equal to the currently detected value R0(k) of the second reception timestamp (sub-step 744').

The management server MS then preferably calculates the delay D(q) as the difference between the measurement reception timestamp R(q) and the measurement transmission timestamp S(q) (sub-step 745). The delay D(k) calculated at sub-step 745 substantially is the delay induced by propagation from the transmitting node N1 to the receiving node N2 on the first packet of the block transmitted during the preceding block period. For instance, by referring again to the above Table I, in case k=5 the delay D(1)=R1(5)−S1(5)=00.04−00.03=00.01 is the delay undergone by the first packet of the block transmitted during the first block period T1. Similarly, in case k=9 the delay D(2)=R0(8)−S0(8)=05.04−05.02=00.02 is the delay undergone by the first packet of the block transmitted during the second block period T2. Further, the management server MS preferably calculates the interarrival jitter J(q) as the difference between the delay D(q) calculated at step 745 and a delay D(q−1) calculated during a previous iteration of step 475 applied to values C1(k), C0(k), C'1(k), C'0(k), S1(k), S0(k), R1(k) and R0(k) previously detected (sub-step 746). The interarrival jitter J(q) calculated at step 746 substantially is the interarrival jitter induced by propagation from the transmitting node N1 to the receiving node N2 between the first packet of the block transmitted during the preceding block period and the first packet of the block transmitted during the still preceding block period. For instance, by referring again to the above Table I, in case k=8 the interarrival jitter J(2)=D(2)−D(1)=00.02−00.01=−00.01 is the interarrival jitter between the first packet of the block transmitted during the second block period T2 and the first packet of the block transmitted during the first block period T1.

It should be noticed that, if the first packet of a block is lost during transmission from the transmitting node N1 to the receiving node N2, this impairs the accuracy of delay and interarrival jitter measurement referred to that block, since the reception timestamp generated at the receiving node is set to the current time provided by the local clock upon reception not of the first packet, but of a successive packet of that block. However, this does not impair the accuracy of delay and interarrival jitter measurements referred to the following blocks. Indeed, loss of the first packet (or of any other packet) in a block does not prevent the receiving node from recognizing the first packet of the successive block, and from properly setting the receiving timestamp for that block. From then on, the delay and interarrival jitter measurement will be then immune from inaccuracy due to loss of the first packet in the previous block.

If at sub-step 742 the management server MS determines that the value C1(k) is different from the value C1(k−1) and the value C0(k) is different from the value C0(k−1) and/or at step sub-742' the management server MS determines that the value C'1(k) is different from the value C'1(k−1) and the value C'0(k) is different from the value C'0(k−1), the management server MS is not able to determine whether the currently transmitted packets Pki are marked by 1 or 0. By referring to Table I, this condition is fulfilled e.g. for k=4 and k=7. In this case, the management server MS preferably does not perform any measurement of delay and interarrival jitter, and after a detection period Td preferably detects successive values of C1, C0, S1, S0, C'1, C'0, R1, R0 (step 72 of the flow chart of FIG. 7).

Besides, if at sub-step 742 the management server MS determines that the value C1(k) is equal to the value C1(k−1) and the value C0(k) is equal to the value C0(k−1) and/or at sub-step 742' the management server MS determines that the value C'1(k) is equal to the value C'1(k−1) and the value C'0(k) is equal to the value C'0(k−1), the management server MS determines that no packets are currently transmitted from N1 to N2. Also in this case, the management server MS preferably does not perform any measurement of delay and interarrival jitter, and after a detection period Td preferably detects successive values of C1, C0, S1, S0, C'1, C'0, R1, R0 (step 72 of the flow chart of FIG. 7). This option is not shown in FIG. 8 for simplicity.

Figure 8:
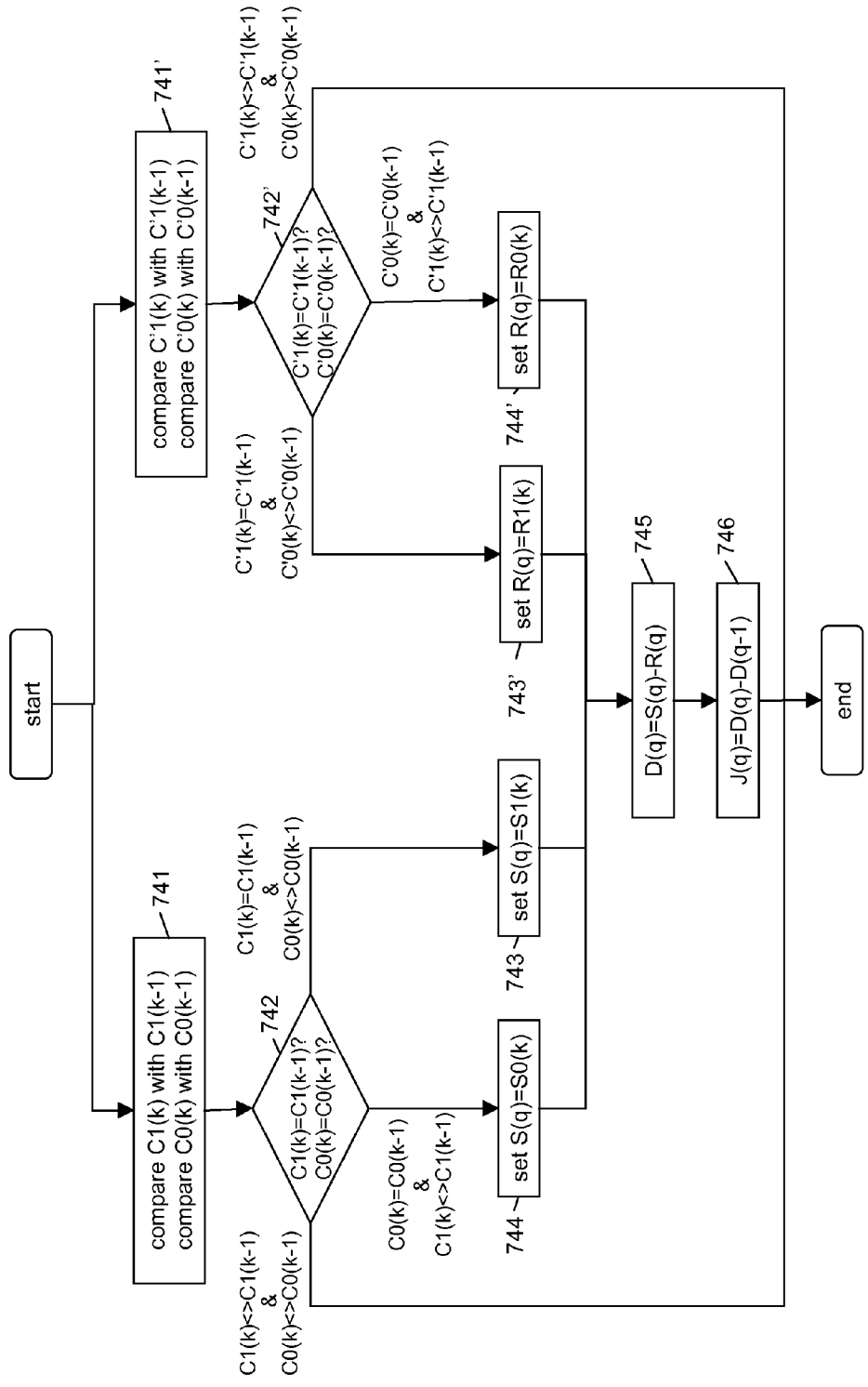
FIG. 8 is a more detailed flow chart of an operation performed by the management server, according to a first embodiment of the present invention.

The sub-step of FIG. 8 are preferably applied each time new values C1(k), C0(k), C'1(k), C'0(k), S1(k), S0(k), R1(k) and R0(k) are detected. However, it can be noticed that delay and interarrival jitter are not calculated for all the values of k. In particular, if the value C1(k) is different from the value C1(k−1) and the value of C0(k) is different from the value C0(k−1), the management server MS does not calculate any delay or interarrival jitter. By referring to Table I, it can be noticed that a single delay D and a single jitter J are calculated for each block period. In other words, the above method allows periodically measuring the delay D and interarrival jitter J of the packet flow PF with a measurement period substantially equal to the block period Tb, since it basically measures the delay D and jitter J only based on timestamps relating to the first packet of each block.

The above method has a number of advantages.

In particular, processing of each packet is advantageously very simple in comparison to the known solutions. Instead of inserting a transmission timestamp in the header of each packet, the above method merely requires marking each packet with a single bit equal to 0 and 1 thereby dividing the packet flow into alternate blocks with a certain block period, and generating a transmission timestamp only for the first packet of each block. The transmission timestamp is not transmitted together with the packets, since marking advantageously allows easily recognizing the first packet of each block at the receiving node, and generating a corresponding reception timestamp. On the other hand, the counters advantageously allow the management server to properly handle the values of the timestamps detected at the transmitting node and receiving node.

At the transmitting node, forming blocks merely requires implementing a timer counting the block period Tb and changing the value of the bit bi of the packets Pki to be transmitted each time the timer expires. This mechanism is very simple and inexpensive, and can be implemented also on high speed ports without the need of using any buffer or complex logics.

Moreover, the time accuracy required by the operation of forming the blocks by suitably marking the packets Pki at the transmitting node is quite low. Indeed, even if the timer counting the block period Tb has a relative high tolerance, or even if there is a delay between timer expiration and change of value of the bit bi, the accuracy of the final result (i.e. the delay and interarrival jitter) is not affected. Indeed, possible oscillations of the block period merely affect the number of packets included in the blocks. The number of packets Pki included in each block however is not fixed, and it does not affect the resulting values of delay and interarrival jitter.

Further, the operation of setting the transmission timestamps to the current time for the first packet of each block is very simple, and can be performed by a simple software module. Further, this operation is performed once every block period Tb, that may be of a few minutes (e.g. 5 minutes). Accordingly, also this operation requires a small amount of computation resources, since it has to be iterated with a quite long period.

Moreover, the method is advantageously simple to implement also at the management server MS. Indeed, the management server MS merely has to detect the values of the counters C1, C0, C'1 and C'0 and of the timestamps S1, S0, R1 and R0 (and to perform very simple operations, such as differences of integer numbers) at least twice for each block period Tb. However, since the block period Tb may be of a few minutes (e.g. 5 minutes), such an operation requires a small amount of computation resources, since it has to be iterated with a quite long period (2 minutes, in case the block period is 5 minutes).

Moreover, advantageously, the receiving node N2 and management server MS may advantageously ignore the block period Tb used at the transmitting node N1. Indeed, the receiving node N2 merely has to increase the counters C'1 and C'0 and generate the reception timestamps R1 and R0 in an asynchronous way, according to the values of the bit bi of the received packets Pki. As to the management server MS, it merely uses the block period Tb for calculating the detection period Td in order to ensure that the values of the counters and timestamps are detected twice for every block period. After calculating the detection period, the detection of the counter and timestamp values requires no synchronization with the transmitting node N1, but simply operates according to the timer implemented at the management server and counting the detection period Td.

This advantageously allows implementing the operations shown in FIGS. 7 and 8 at any server cooperating with the communication network CN, such as for instance the server responsible of performing management operations (alarm monitoring, performance monitoring, network nodes configuration, and so on) upon the network nodes of the communication network CN.

In case only the interarrival jitter has to be measured, no synchronization is required between the transmitting node and the receiving node. Indeed, the transmission and reception timestamps are generated according to the local clocks of the transmitting node and receiving node, respectively. Such local clocks should have substantially the same frequency, but they may not be synchronized, i.e. they can indicate different absolute times. Such a difference is advantageously eliminated when the above equation [2] is applied for measuring the interarrival jitter.

In the above description, it has been assumed that each block has a same duration equal to the block period Tb. However, according to advantageous variants not shown in the drawings, alternating blocks may have different durations. For instance, the blocks comprising packets marked with 1 may have a first duration Tb1, while the blocks comprising packets marked with 0 may have a second duration Tb0 different from the first duration Tb1.

Further, it has been assumed that all packets are marked. According to advantageous variants not shown in the drawings, for instance, only packets belonging to even blocks (or odd blocks) may be marked. According to these variants, the transmission and reception timestamps are preferably generated only for the first packet of blocks comprising marked packets. According to these variants, the measurement period of delay and interarrival jitter is then equal to twice a single block period Tb.

As mentioned above, according to the first embodiment (where all blocks comprise marked packets and the duration of all the blocks is equal to the block period Tb), the measurement period of delay and jitter is substantially equal to the block period Tb. For decreasing the measurement period, the block period Tb may be suitably decreased. Alternatively, according to a second embodiment, a transmission timestamp and a reception timestamp may be provided not only for the first packet of each block, but also for predefined subsequent packets of each block.

More particularly, according to this second embodiment, a number M is set, which is preferably an integer number than can be fixed a priori by the network operator. M may be for instance equal to 100.

With reference to FIG. 3, according to this second embodiment, during the first time period T1, instead of checking whether the index m is equal to 1 (step 307), according to this second embodiment the transmitting node N1 preferably checks whether m mod N (i.e. the remainder of m divided by M) is equal to 0. In the affirmative, the transmitting node N1 sets the first transmission timestamp S1 to the current time provided by the local clock of the transmitting node N1 (step 308). Therefore, according to this second embodiment the first transmission timestamp S1 is set not only for the first packet of the first block B1, but also for the packets M+1, 2M+1, 3M+1, etc. of the first block B1. Therefore, if N is the overall number of packets transmitted during the first time period T1, the integer part of (N/M) is the number of different values that the first transmission timestamp S1 assumes during the first block period T1.

Similarly, during the second time period T2, instead of checking whether the index m is equal to 1 (step 314), according to this second embodiment the transmitting node N1 preferably checks whether m mod N (i.e. the remainder of m divided by M) is equal to 0. In the affirmative, the transmitting node N1 sets the second transmission timestamp S0 to the current time provided by the local clock of the transmitting node N1 (step 315). Therefore, the second transmission timestamp S0 is set not only for the first packet of the second block B2, but also for the packets M+1, 2M+1, 3M+1, etc. of the second block B2. Again, if N is the overall number of packets transmitted in the second time period T2, the integer part of (N/M) is the number of different values that the second transmission timestamp S0 assumed during the second block period T2.

The same preferably applies to the subsequent block periods.

With reference now to FIG. 5, according to this second embodiment, if at step 505 the receiving node N2 determines that the received packet marked by 1 is the first packet of a block, it preferably sets the first reception timestamp R1 to the current time provided by the local clock of the receiving node N2. Upon reception of a successive packet having the same marking, the receiving node N2 preferably checks whether it is the packet M+1, 2M+1, 3M+1, etc. of the block. In the affirmative, the receiving node N2 preferably sets the first reception timestamp R1 to the current time provided by the local clock of the receiving node N2. Therefore, according to this second embodiment, the first reception timestamp R1 is set not only for the first packet of the block, but also for the packets M+1, 2M+1, 3M+1, etc. of the block.

Similarly, according to this second embodiment, if at step 508 the receiving node N2 determines that the received packet marked by 0 is the first packet of a block, it preferably sets the second reception timestamp R0 to the current time provided by the local clock of the receiving node N2. Upon reception of a successive packet having the same marking, the receiving node preferably checks whether it is packet M+1, 2M+1, 3M+1, etc. of the block. In the affirmative, the receiving node N2 preferably sets the second reception timestamp R0 to the current time provided by the local clock of the receiving node N2. Therefore, according to this second embodiment, the second reception timestamp R0 is set not only for the first packet of the block, but also for the packets M+1, 2M+1, 3M+1, etc. of the block.

The operation of the management server MS according to this second embodiment is preferably similar to the one shown in FIG. 7. In brief, the management server MS determines a detection period Td (step 71) and detects the values C1(k), C0(k), S1(k), S0(k), C'1(k), C'0(k), R1(k) and R0(k) once for each detection period Td. Then, the management server MS preferably uses the detected values C1(k), C0(k), S1(k), S0(k), C'1(k), C'0(k), R1(k) and R0(k) for calculating delay D and jitter J.

By referring now to FIG. 8, according to this second embodiment, each time the management server MS detects the values C1(k), C0(k), S1(k), S0(k), C'1(k), C'0(k), R1(k) and R0(k) and determines that C1(k)=C1(k−1) and C'1(k)= C'1(k−1) while C0(k)<>C0(k−1) and C'0(k)<>C'0(k−1), it preferably realizes that the first counter C1 and the third counter C'1 have a fixed value while the second counter C0 and the fourth counter C'0 are increasing, since the packets Pki currently transmitted by N1 and received by N2 are marked by their bit bi equal to 0. Then, the management server MS preferably calculates a data loss DL(k) as the difference between the currently detected value C1(k) of the first counter C1 and the currently detected value C'1(k) of the third counter C'1.

It has to be noticed that, although the value of DL(k) is calculated at a block period during which packets Pki with their bit bi at the value 0 are transmitted (i.e. the second block period T2 of FIG. 4), it refers to the previous block period, i.e. to a block period during which packets Pki marked by their bit bi equal to 1 are transmitted.

Similarly, according to this second embodiment, each time the management server MS detects the values C1(k), C0(k), S1(k), S0(k), C'1(k), C'0(k), R1(k) and R0(k) and determines that C0(k)=C0(k1) and C'0(k)=C'0(k1) while C1(k)<>C1 (k−1) and C'1(k)<>C'1(k−1), it preferably realizes that the second counter C0 and the fourth counter C'0 have a fixed value, while the first counter C1 and the third counter C'1 are increasing, since the packets Pki currently transmitted by N1 and received by N2 are marked by their bit bi equal to 1. The management server MS then calculates the data loss DL(k) as the difference between the currently detected value C0(k) of the second counter C0 and the currently detected value C'0(k) of the fourth counter C'0.

It has to be noticed that, although the value of DL(k) is calculated at a block period during which packets Pki with their bit bi at the value 1 are transmitted (i.e. the third block period T3 of FIG. 4), it refers to the previous block period, i.e. to a block period during which packets Pki marked by their bit bi equal to 0 are transmitted.

Once the value DL(k) of the data loss has been calculated, the management server MS preferably checks whether DL(k) is equal to zero.

In the affirmative, the management server MS preferably determines that no data loss occurred in the block transmitted during the previous block period, and accordingly calculates delay and interarrival jitter as described above.

In the negative, the management server MS preferably determines that a data loss occurred in the block transmitted during the previous block period. Therefore, one or more of the packets M+1, 2M+1, 3M+1, etc. of the transmitted block may not correspond to the packets M+1, 2M+1, 3M+1, etc. of the corresponding received block. One or more of the reception timestamps generated at the receiving node N2 may then be not reliable, since they may indicate the reception time of packets other than the packets M+1, 2M+1, 3M+1, etc. In that case, according to this second embodiment, the management server MS determines that no reliable determination of the delay and interarrival jitter may be performed on that block.

Accordingly, the management server MS preferably does not calculate delay and interarrival jitter, and detects the next values of C1, C0, C'1, C'0, S1, S0, R1 and R0. Alternatively, the management server MS may decide to calculate anyway delay and interarrival jitter, and possibly to associate to the delay D and interarrival jitter J an "unreliable measurement" information.

It should be noticed that, according to this second embodiment, if the first packet and/or one or more packets M+1, 2M+1, 2M+1, etc. of a block are lost during transmission from the transmitting node N1 to the receiving node N2, this impairs the accuracy of the N mod M (N being the number of packets of that block) delay and interarrival jitter measurements referred to that block. However, this does not impair the accuracy of delay and interarrival jitter measurements referred to the following blocks. Indeed, loss of the first packet and/or of one or more packets M+1, 2M+1, 2M+1, etc. in a block does not prevent the receiving node from recognizing the first packet and the packets M+1, 2M+1, 3M+1, etc. of the successive block, and to properly set the receiving timestamp for that successive block. From then on, the delay and interarrival jitter measurement will be then advantageously immune from inaccuracy due to loss of packets in the previous block.

Then, according to this second embodiment, the measurement period of delay and interarrival jitter relative to the packet flow FP is reduced from Tb to Tb/int(N/M), N being the number of packets in a block and int(N/M) indicating the integer part of N/M. Since the number of packets in a block varies according to the traffic conditions, according to this second embodiment also the measurement period varies from block to block according to the traffic conditions.

Although the method has been described in detail only for measuring delay and/or interarrival jitter of a packet flow PF between two physically adjacent nodes (i.e. the transmitting node N1 and the receiving node N2), according to embodiments not shown in the drawings, it can be used for measuring delay and/or interarrival jitter of a packet flow between two non-physically adjacent nodes. In particular, it can be used for measuring delay and/or interarrival jitter relative to an end-to-end packet flow transmitted from a given source node to a given destination node. In this case, the source node preferably identifies the packets belonging to the end-to-end packet flow (e.g. by using their source address and their destination address) and applies the above steps shown in FIG. 3 only to the identified packets. On the other hand, also the destination node identifies the packets belonging to the end-to-end packet flow, and applies the above steps shown in FIG. 5 only to the identified packets. In this way, the source and destination node may provide to the management server MS the counters C1, C0, C'1 and C'0 and the timestamps S1, S0, R1, R0, that the management server MS may use for calculating an end-to-end delay and/or interarrival jitter.

The above method may be applied both in case of point-to-point transmission, and in case of point-to-multipoint, or multicast, transmission. In this latter case, a separate measurement of delay and/or interarrival jitter can be performed for each destination node of the point-to-multipoint transmission.

According to further embodiments, the above disclosed method is applied to an end-to-end packet flow for measuring the end-to-end delay and/or interarrival jitter and also the amount of delay and/or interarrival jitter accumulated upon transmission on each intermediate hop. To this purpose, each intermediate node receiving packets to be forwarded to the destination node acts both as a receiving node and as a transmitting node. In particular, the intermediate node applies the above steps shown in FIG. 5 to packets received from an upstream node, while it applies the above steps shown in FIG. 3 to the same packets before forwarding them to a downstream node. In this way, the source node generates a first couple of counters C1, C0 and a first couple of transmission timestamps S1, S0, the first intermediate node generates a second couple of counter C'1, C'0, a first couple of reception timestamps R1, R0, a third couple of counters C"1, C"0 and a second couple of transmission timestamps S'1, S'0, the second intermediate node generates a fourth couple of counters C"'1, C"'0, a second couple of reception timestamps R'1, R'0, a fifth couple of counters C"''1, C"''0 and a third couple of transmission timestamps S"1, S"0 and so on. The management server MS preferably periodically detects the value of all these counters and timestamps, and processes them for calculating the delay and/or the interarrival jitter on each hop. For instance, the first couple of counters C1, C0, the first couple of transmission timestamps S1, S0, the second couple of counters C'1, C0 and the first couple of reception timestamps R1, R0 are used for calculating the delay and/or interarrival jitter on the first hop between the source node and the first intermediate node; the third couple of counters C"1, C"0, the second couple of transmission timestamps S'1, S'0, the fourth couple of counters C"'1, C"'0 and the second couple or reception timestamps R'1, R'0 are used for calculating the delay and/or the interarrival jitter on the second hop between the first intermediate node and the second intermediate node; and so on. The combination of the delay and interarrival jitter results on each hop allows the management server MS to calculate the end-to-end delay and interarrival jitter relative to the packet flow.

According to further embodiments not shown in the drawings, in addition to the bit bi, at least another bit of each packet Pki is reserved for marking the packets Pki. For instance, a further bit in the header of each packet Pki may be used for marking the packet Pki as follows: when this further bit is set to 0, it indicates that this packet Pki belongs to a packet flow currently not being measured, while when this further bit is equal to 1, it indicates that the packet Pki belongs to a packet flow currently being measured. This advantageously packets of a packet flow to be measured to be distinguished from other packet flows not to be measured without the need to read any other information in the packet header (such as for instance the source node address or the destination node address, as mentioned above). According to still further embodiments not shown in the drawings, a number of bits of the header of each packet Pki may be used for marking the packets so as to indicate different packet flows to be measured. For instance, 2 bits of the header would allow identifying three different packets flows, while 3 bits would allow identifying seven different packet flows.

The bit bi (and possible further bits for identifying the packets flows to be measured) may be provided into the header of packets to be transmitted by suitably modifying the protocols according to which the packets are formatted. For instance, if the packets Pki are formatted according to the MPLS (Multi Protocol Label Switching), the label field of the MPLS header may include the bit bi and may also be used for identifying different packet flows to be measured.

Figure 9:
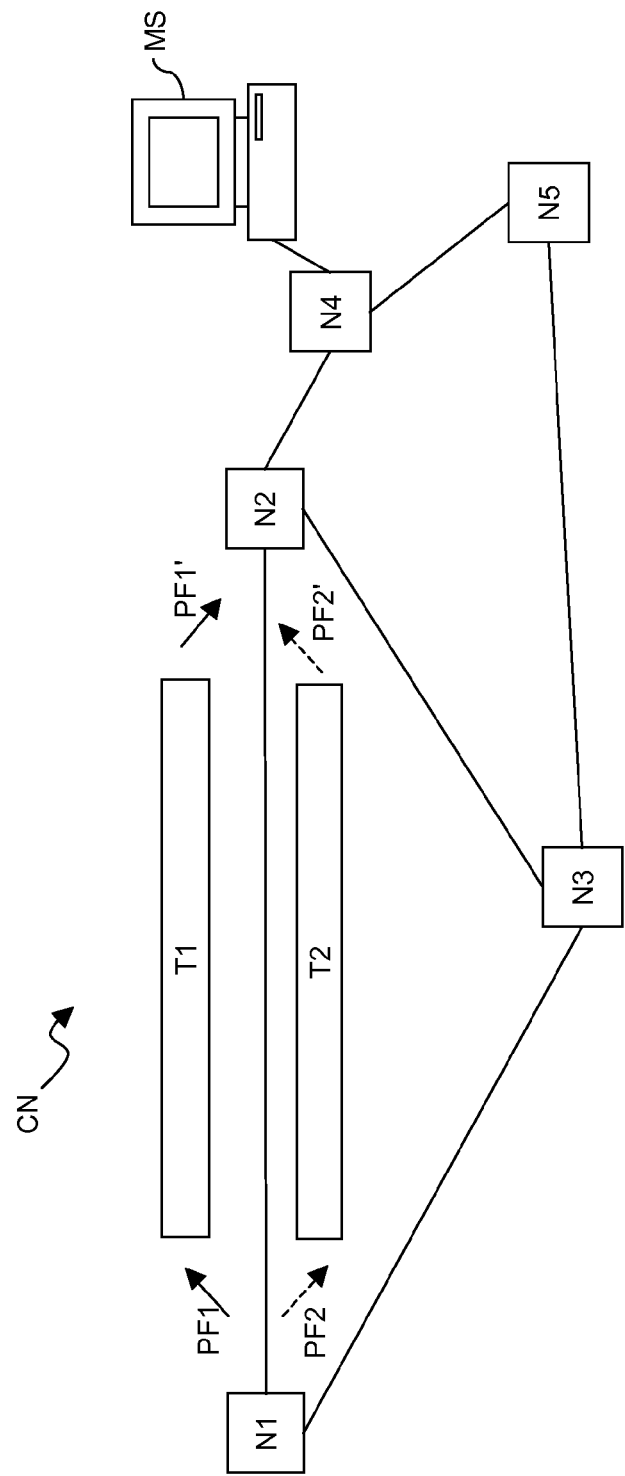
FIG. 9 shows an application of the method of the invention to the communication network of FIG. 1.

In particular, FIG. 9 schematically shows an application of the communication network CN of FIG. 1 in case packets are formatted according to the MPLS.

In this situation, the label field of the packet headers is used for alternately transmitting the packets Pki from the transmitting node N1 to the receiving node N2 through a first tunnel T1 (for a block period Tb) and a second tunnel T2 (for a block period Tb). Therefore, a first packet flow PF1 is transmitted through the first tunnel T1, and a second packet flow PF2 is transmitted through the second tunnel T2.

For performing a time measurement on the link between N1 and N2, delay and/or interarrival jitter are separately measured on the first tunnel T1 and on the second tunnel T2. In particular, the delay and /or interarrival jitter of packets entering and exiting each tunnel is measured, substantially with a same detection period Td, according to the procedure described above.

If a number of packet flows has to be transmitted from the transmitting node N1 to the receiving node N2, each packet flow is assigned to a respective pair of tunnels. For each packet flow, the time measurement is performed as described above.

The invention claimed is:

1. A method for performing a time measurement on a data flow to be transmitted from a transmitting node to a receiving node of a communication network, said method comprising:
   a) at said transmitting node:
      dividing said data flow in first blocks, each of said first blocks comprising a number of data units, and in second blocks, each of said second blocks comprising a number of further data units, said first blocks alternating in time with said second blocks, said dividing being performed by setting a feature of said data units to a first value and by setting said feature of said further data units to a second value; and
      transmitting said first blocks and said second blocks, said transmitting comprising increasing a first transmission counter each time one of said data units of said first blocks is transmitted and setting a first transmission timestamp to a current time when a predetermined data unit of each of said first blocks is transmitted;
   b) at said receiving node, receiving said first blocks and said second blocks, said receiving comprising increasing a first reception counter each time one of said data units of said first blocks is received and setting a first reception timestamp to a further current time when said predetermined data unit of each of said first blocks is received; and
   c) at a management server cooperating with said communication network including the transmitting node and the receiving node, while said steps a) and b) are performed, periodically detecting with a detection period Td values of said first transmission counter, said first reception counter, said first transmission timestamp and said first reception timestamp, and performing a time measurement on said data flow based on detected values of said first transmission counter, said first reception counter, said first transmission timestamp and said first reception timestamp.

2. The method according to claim 1, wherein said dividing comprises marking each data unit of said first blocks by setting at least one bit of said data unit to said first value and marking each further data unit of said second blocks by setting at least one bit of said further data unit to said first value.

3. The method according to claim 1, wherein said dividing comprises dividing said data flow in said first blocks and said second blocks all having a time duration equal to a block period.

4. The method according to claim 3 wherein, in said periodically detecting with said detection period, said block period is equal to at least twice said detection period.

5. The method according to claim 1, wherein:
   at said step a), said transmitting further comprises increasing a second transmission counter each time one of said further data units of said second blocks is transmitted and setting a second transmission timestamp to a current time when a predetermined further data unit of each of said second blocks is transmitted;
   at said step b), said receiving further comprises increasing a second reception counter each time one of said further data units of said second blocks is received and setting a second reception timestamp to a further current time when said predetermined further data unit of each of said second blocks is received; and
   at said step c), said detecting further comprises periodically detecting values of said second transmission counter, said second reception counter, said second transmission timestamp and said second reception timestamp, and performing said time measurement on said data flow based also on detected values of said second transmission counter, said second reception counter, said second transmission timestamp and said second reception timestamp.

6. The method according to claim 5, wherein at said step c) said performing said time measurement comprises, at each detection period, comparing the value of said first transmission counter, the value of said second transmission counter, the value of said first reception counter and the value of said second reception counter detected at said detection period with one or more previously detected values of said first transmission counter, said second transmission counter, said first reception counter and said second reception counter for determining whether each of said first transmission counter, said second transmission counter, said first reception counter and said second reception counter currently has a constant value or is increasing.

7. The method according to claim 6, wherein at said step c) said performing said time measurement comprises, at each detection period:
   if said first transmission counter has a constant value and said second transmission counter is increasing, setting a measurement transmission timestamp equal to the value of said first transmission timestamp detected at said detection period; and
   if said first transmission counter is increasing and said second transmission counter has a constant value, setting said measurement transmission timestamp equal to the value of said second transmission timestamp detected at said detection period.

8. The method according to claim 7, wherein at said step c) said performing said time measurement comprises, at each detection period:
   if said first reception counter has a constant value and said second reception counter is increasing, setting a measurement reception timestamp equal to the value of said first reception timestamp detected at said detection period; and if said first reception counter is increasing and said second reception counter has a constant value, setting said measurement reception timestamp equal to the value of said second reception timestamp detected at said detection period.

9. The method according to claim 8, wherein at said step c) said performing said time measurement comprises, at each detection period, calculating a delay as a difference between said measurement reception timestamp and said measurement transmission timestamp.

10. The method according to claim 9, wherein at said step c) said performing said time measurement comprises, at each detection period, calculating an interarrival jitter as a difference between said delay calculated at said detection period and a previous delay calculated during a previous detection period.

11. The method according to claim 1, wherein:
at said step a), said setting said first transmission timestamp to a current time is performed each time a first data unit of said first blocks is transmitted; and
at said step b), said setting said first reception timestamp to a further current time is performed each time said first data unit of said first blocks is received.

12. The method according to claim 11, wherein:
at said step a), said setting said first transmission timestamp to a current time is performed also each time an (n*M)+1 data unit of said first blocks is transmitted; and
at said step b), said setting said first reception timestamp to a further current time is performed also each time said (n*M)+1 data unit of said first blocks is received,
M being a fixed integer number and n being an integer index.

13. The method according to claim 12, wherein said step c) further comprises periodically calculating a data loss for validating said time measurement.

14. A communication network comprising:
a transmitting node;
a receiving node; and
a management server suitable for cooperating with said communication network, wherein:
said transmitting node is configured to:
divide a data flow in first blocks, each of said first blocks comprising a number of data units, and in second blocks, each of said second blocks comprising a number of further data units, said first blocks alternating in time with said second blocks, said divide being performed by setting a feature of said data units to a first value and by setting said feature of said further data units to a second value; and
transmit said first blocks and said second blocks, said transmitting comprising increasing a transmission counter each time one of said data units of said first blocks is transmitted and setting a transmission timestamp to a current time when a predetermined data unit of each of said first blocks is transmitted;
said receiving node is configured to receive said first blocks and said second blocks, said receiving comprising increasing a reception counter each time one of said data units of said first blocks is received and setting a reception timestamp to a further current time when said predetermined data unit of each of said first blocks is received; and
said management server is configured to, while said transmitting node and said receiving node operate, periodically detect with a detection period Td values of said transmission counter, said reception counter, said transmission timestamp and said reception timestamp, and perform a time measurement on said data flow based on detected values of said transmission counter, said reception counter, said transmission timestamp and said reception timestamp.

15. A computer readable non-transitory storage medium having software code portions stored thereon that, when executed by a computer, perform the steps of:
a) at a transmitting node:
dividing a data flow in first blocks, each of said first blocks comprising a number of data units, and in second blocks, each of said second blocks comprising a number of further data units, said first blocks alternating in time with said second blocks, said dividing being performed by setting a feature of said data units to a first value and by setting said feature of said further data units to a second value; and
transmitting said first blocks and said second blocks, said transmitting comprising increasing a transmission counter each time one of said data units of said first blocks is transmitted and setting a transmission timestamp to a current time when a predetermined data unit of each of said first blocks is transmitted;
b) at a receiving node, receiving said first blocks and said second blocks, said receiving comprising increasing a reception counter each time one of said data units of said first blocks is received and setting a reception timestamp to a further current time when said predetermined data unit of each of said first blocks is received; and
c) at a management server cooperating with a communication network including the transmitting node and the receiving node, while said steps a) and b) are performed, periodically detecting with a detection period Td values of said transmission counter, said reception counter, said transmission timestamp and said reception timestamp, and performing a time measurement on said data flow based on detected values of said transmission counter, said reception counter, said transmission timestamp and said reception timestamp.

* * * * *